UNITED STATES PATENT OFFICE 2,500,673

PROCESS OF PRODUCING A PHOSPHATE COATING ON METALS HIGH IN ALUMINUM

Robert C. Gibson, Birmingham, and William S. Russell, Royal Oak, Mich., assignors to Parker Rust Proof Company, Detroit, Mich.

No Drawing. Application May 22, 1947,
Serial No. 749,868

3 Claims. (Cl. 148—6.15)

This invention relates to a process of producing phosphate coatings on metals high in aluminum and particularly where the coating solution is applied by spraying. In our prior application for Process of and material for producing phosphate coatings on metals, filed September 11, 1946, Serial No. 696,336, now abandoned, we have disclosed a process and material suitable for coating aluminum, iron, or zinc, or mixtures thereof, or the different metals in succession. These coating operations, of course, also apply to alloys of the metals named containing minor amounts of various other metals.

We disclosed in said prior application that where the production is for a considerable time, mainly on aluminum surfaces, the operation of the solution is markedly improved by introducing iron into the solution. In many factories it is preferred to apply the coating solution by the spraying process. When a phosphate coating solution containing iron is sprayed through the air, the ferrous phosphate in the solution is largely oxidized to an insoluble ferric phosphate and precipitated as sludge. Therefore, it is impractical to maintain or improve the coating action of the solution by the addition of iron where the solution is applied by spraying.

Where the coating for a considerable time is entirely or predominately of aluminum surfaces, the difficulty referred to in our prior application is encountered when the solution is applied by spraying as well as when employed by the immersion process. A great deal of difficulty has been encountered in an endeavor to remedy this situation. At last it has been discovered that the coating action of a solution of the type disclosed in our aforesaid prior application can be maintained where the solution is applied by spraying to predominately aluminum surfaces by the addition of fluorine compounds such as sodium fluoride and neutralizing sodium compounds such as sodium carbonate. Where these remedial compounds are added to the solution there is formed an insoluble compound apparently having the composition indicated by $Na_3AlF_6$, and this insoluble material is precipitated, removing the excess aluminum from the solution. As disclosed in our said prior application, one example of the general purpose solution for preparing a coating bath which has been used successfully follows:

| | Pounds |
|---|---|
| $H_3PO_4$, 75% | 370 |
| $HNO_3$, 42° Bé | 715 |
| ZnO | 425 |
| Boric acid | 180 |
| HF, 60% | 165 |
| Sodium bifluoride | 170 |
| Water to test 46.5° Bé. at 80° F. | |

When 60 grams of the solution are diluted to 1000 cc., from 2.4 to 2.6 cc. of tenth normal NaOH should be required to neutralize 10 cc. of the solution using bromphenol blue as indicator and from 19.5 to 20.5 of the hydroxide using phenolphthalein as indicator. ZnO or $H_3PO_4$ is added if necessary to bring the solution within that range. A solution made up in this way may be sprayed upon the work, or articles to be coated may be dipped in the solution.

A general purpose replenishing solution for the bath prepared as indicated above may be made up as follows:

| | Pounds |
|---|---|
| 75% $H_3PO_4$ | 1,295 |
| $HNO_3$, 42° Bé. | 700 |
| ZnO | 745 |
| $H_3BO_3$ | 235 |
| 60% HF | 450 |
| $Na_2CO_3$ | 25 |
| Water to test 46.0° Bé. at 80° F. | |

The foregoing ingredients are believed to furnish in the solution the following compounds in the proportions given below.

| | Per cent |
|---|---|
| $Zn(BF_4)_2$ | 7.8 |
| $Zn(NO_3)_2$ | 13.8 |
| $Zn(H_2PO_4)_2$ | 18.7 |
| $H_3BO_3$ | 0.5 |
| $H_3PO_4$ | 4.7 |

Sufficient $H_3PO_4$ should be present to keep the dihydrogen phosphate in solution.

The $H_3BO_3$ in excess of that necessary to form the fluoborate may be present in any amount from zero to saturation. The zinc fluoborate may vary from 25% to 85% of the amount of phosphate and the zinc nitrate may vary from 30% to 150% of the phosphate.

If the solution is employed on mixed metals comprising a considerable amount of zinc or iron or even where the surfaces are composed largely of aluminum alloys high in copper, little difficulty is encountered in keeping the solution working satisfactorily. If aluminum surfaces constitute substantially the entire amount of work being coated, it is found advisable to add approximately 1 lb. of sodium bifluoride ($NaHF_2$) and 1 lb. of sodium carbonate ($Na_2CO_3$) or their equivalent, for each 6 lbs. of the said replenishing material. If the work processed comprises aluminum alloys high in copper or considerable zinc surface or iron surface or mixtures of these surfaces, the amount of sodium bifluoride and sodium carbonate employed may be proportionately reduced and as previously indicated, these additional materials are not necessary at all where the proportion of aluminum coated is sufficiently reduced.

Where it is intended to employ the solution continuously upon work the surfaces of which are almost entirely aluminum, the replenishing solution may have fluoride added thereto, so that only the sodium carbonate needs to be added separately. Under such circumstances, a replenishing solution may be made substantially in accordance with the following formula.

|  | Parts by weight |
|---|---|
| 75% $H_3PO_4$ | 1,295 |
| 42° Bé. $HNO_3$ | 700 |
| ZnO | 830 |
| $H_3BO_3$ | 730 |
| 60% HF | 1,018 |
| $NaHF_2$ | 307 |

Water to produce a specific gravity of about 1.43.

One pound of sodium carbonate or its equivalent should be added for each six pounds of the modified replenishing solution.

Where mixed metals are coated, and particularly where the proportion of aluminum to other surfaces coated varies materially from time to time, it is advisable to employ a replenishing solution substantially in accordance with the first formula therefor given above, and to add both fluoride and neutralizing agent when and as required.

It will be seen that the improvement consists in adding to the solution, materials which can combine with the excess aluminum and form insoluble sodium aluminum fluoride and thereby remove the excess aluminum and still leave sufficient fluoride compounds in the solution to accomplish its purpose. It will be readily understood that while exact formulas have been given which have proven satisfactory in commercial production, various modifications may be made in accordance with the principles known to those skilled in the art.

In the appended claims "in balance" is used in reference to the proper portion of free acid and total acid, as measured by the use of bromophenol blue and phenolphthalein or equivalent indicators, that being the usual meaning of the term in this art, as will be found in Parker Rust Proof Co. v. Ford, 6 F. (2d) 649 (see especially 2nd column on page 652) and in numerous patents issued since the time of that decision.

What we claim is:

1. A method of coating metal surfaces with a phosphate coating where said surfaces consist predominantly of aluminum which comprises spraying on to said surfaces a solution containing acid phosphate and fluoborate and an oxidizing agent as its essential active ingredients and maintaining the balance of the solution by adding a neutralizing sodium compound and acidic fluoride in amounts to combine with aluminum and form $Na_3AlF_6$ and remove excess aluminum from the solution.

2. A method of coating metal surfaces with a phosphate coating where said surfaces consist predominantly of aluminum which comprises spraying on to said surfaces a solution containing acid phosphate and fluoborate and an oxidizing agent as its essential active ingredients and maintaining the balance of the solution by adding a neutralizing sodium compound and acidic fluoride in amounts to combine with aluminum and form $Na_3AlF_6$ and remove excess aluminum from the solution and increasing and decreasing the amount of such additions as the proportion of aluminum to other metals treated is increased and decreased.

3. A concentrated solution for use in replenishing a dilute solution for coating surfaces consisting predominantly of aluminum, said concentrated solution having a composition substantially the same as that resulting from dissolving in water the following ingredients:

|  | Parts by weight |
|---|---|
| 75% $H_3PO_4$ | 1,295 |
| 42° Bé. $HNO_3$ | 700 |
| ZnO | 830 |
| $H_3BO_3$ | 730 |
| 60% HF | 1,018 |
| $NaHF_2$ | 307 |

ROBERT C. GIBSON.
WILLIAM S. RUSSELL.

REFERENCES CITED

The following references are of record in the file of this patent:

UNITED STATES PATENTS

| Number | Name | Date |
|---|---|---|
| 2,182,510 | Heiser | Dec. 5, 1939 |
| 2,213,263 | Thompson | Sept. 5, 1940 |
| 2,276,353 | Thompson | Mar. 17, 1942 |
| 2,312,855 | Thompson | Mar. 2, 1943 |

FOREIGN PATENTS

| Number | Country | Date |
|---|---|---|
| 11,963 1899 | Great Britain | Apr. 14, 1900 |